US005940030A

United States Patent [19]

Hampel et al.

[11] Patent Number: 5,940,030

[45] Date of Patent: Aug. 17, 1999

[54] STEERABLE PHASED-ARRAY ANTENNA HAVING SERIES FEED NETWORK

[75] Inventors: Karl Georg Hampel, New York, N.Y.; Gary M. Hojell, Kinnelon, N.J.

[73] Assignee: Lucent Technologies, Inc., Murray Hill, N.J.

[21] Appl. No.: 09/040,848

[22] Filed: Mar. 18, 1998

[51] Int. Cl.[6] .......... H01G 3/24

[52] U.S. Cl. .......... 342/372; 342/368

[58] Field of Search .......... 342/157, 368, 342/372; 343/700 MS

[56] References Cited

U.S. PATENT DOCUMENTS

| | | | |
|---|---|---|---|
| 3,806,932 | 4/1974 | Dietrich et al. | 343/100 SA |
| 3,906,502 | 9/1975 | Connolly | 343/100 SA |
| 4,203,116 | 5/1980 | Lewin | 343/700 MS |
| 4,492,962 | 1/1985 | Hansen | 343/369 |
| 4,737,796 | 4/1988 | Munson et al. | 342/361 |
| 5,029,036 | 7/1991 | Bull et al. | 342/368 |
| 5,617,103 | 4/1997 | Koscica et al. | 343/700 MS |

*Primary Examiner*—Thomas Tarcza
*Assistant Examiner*—Dao L. Phan

[57] ABSTRACT

A phased-array antenna in accordance with illustrative embodiments of the present invention advantageously includes a plurality of radiating elements and a phase-shifter array integrated into a feed line of the antenna's series feed network. The phase-shifter array advantageously comprises a plurality of phase-shifting slabs each of which includes a phase-shifting member, advantageously comprised of a dielectric material. When placed in electromagnetic fields generated by signals propagating through different regions of a feed line, the phase-shifting members affect the phase of such signals. Each slab in the phase-shifter array also advantageously incorporates at least one impedance-matching member that decreases or eliminates an impedance mismatch between air-suspended and dielectric-loaded regions of the transmission line over the full phase-shifting range of the phase-shifting members. Since phased-array antennas in accordance with the illustrative embodiments are well impedance matched, relatively high-dielectric-constant materials may be used for the phase shifters. As such, the phase shifters provide a high differential phase shift that contributes to a large phase-shifting range and a large antenna beam steering range. In some embodiments, the present phased-array antennas are configured such that relatively little phase is required between adjacent radiating elements so that antenna bandwidth is relatively broad. The present phased-array antennas advantageously use Wilkinson power splitters and one impedance-matching member per phase shifter to reduce sensitivity to impedance mismatch from radiating elements while keeping phase between adjacent radiating elements quite small.

14 Claims, 5 Drawing Sheets

STEERABLE PHASED-ARRAY ANTENNA HAVING SERIES FEED NETWORK

STATEMENT OF RELATED CASES

The present case is related to applicants' copending U.S. patent applications Ser. No. 09/040,850 filed Mar. 18, 1998, entitled, "Article Comprising a Phase Shifter," and Ser. No. 09/040,780 filed Mar. 18, 1998 entitled "Steerable Phased-Array Antenna," both of which are assigned to the present assignee and incorporated by reference herein.

FIELD OF THE INVENTION

The present invention relates to telecommunications. More particularly, the present invention relates to a steerable phased-array antenna having a series feed network.

BACKGROUND OF THE INVENTION

There has been explosive growth in the area of wireless communications. A few years ago, the sight of a person speaking into a cellular phone was a curiosity; now it is commonplace. Communication via cellular phones is supported by wireless telecommunications systems. Such systems service a particular geographic area that is partitioned into a number of spatially-distinct areas called "cells." Each cell usually has an irregular shape (though idealized as a hexagon) that depends on terrain topography. Typically, each cell contains a base station, which includes, among other equipment, radios and antennas that the base station uses to communicate with the wireless terminals (e.g., cellular phones) in that cell.

The antenna used for transmitting signals from a base station is typically a linear phased-array antenna. A phased-array antenna is a directive antenna having several individual, suitably-spaced radiating antennas, or elements. The response of each radiating element is a function of the specific phase and amplitude of a signal applied to the element. The phased array generates a radiation pattern ("beam") characterized by a main lobe and side lobes that is determined by the collective action of all the radiating elements in the array.

It may be desirable, at times, to adjust the geographic coverage of a particular base station. This can be accomplished changing the azimuth ("beam steering") or elevation ("beam tilting") or both (henceforth "beam steering"), of the beam generated by a base station's transmit antenna. The beam generated by a linear phased-array antenna can be steered by employing a progressive element-to-element phase shift.

A signal for transmission is delivered to the phased array via a corporate or a series feed network. FIG. 1 depicts a conventional phased-array antenna 100 having an asymmetric series-feed network. Signal 104 traveling along feed transmission line 102 is split, successively, by power splitters 110–116, and directed via branch transmission lines 120–128 to radiating elements 140–148. Branch transmission lines 120–128 are of identical length so that no phase shift is introduced by the feed network itself. Phase shifters 130–136 are operable to introduce phase shift into the signals traveling along transmission line 102.

Phase shifters 130 to 136 are disposed in feed line 102 to each individual branch line 120–128. As such, the signal entering each successive phase shifter has shifted in the preceding phase shifters. Since the phase differential required for each adjacent radiating element is $\Delta\phi$, the "tuning" or "phase shifting range" for each phase shifter

120–128 is the same and has a maximum value of only $1\Delta\phi$. In corporate-fed phased-array antennas, the phase shifters are typically located in branch lines. In such an arrangement, the signal entering each successive phase shifter has not been shifted in preceding phase shifters. As such, the total tuning range per phase shifter must increase progressively from element-to-element. For example, relative to a reference radiating element, an adjacent element is shifted by $1\Delta\phi$, which shift is provided by a first phase shifter, the next radiating element is shifted by $2\Delta\phi$, which shift is provided by a second phase shifter, and so forth. In general, the final phase shifter in a phased array using a corporate-feed network and having n radiating elements requires a tuning range of $(n-1)\Delta\phi$.

It will be appreciated that the required progressive increase in phase-shifting range restricts the corporate-fed phased-array to relatively few radiating elements. And, of course, each phase-shifter is different, so that manufacturing expediencies related to having identical phase-shifters, such as is possible with a series-feed implementation, are lost. It would therefore be desirable, in some embodiments, to use a series-fed phased-array antenna in preference to a corporate-fed phased-array antenna.

Series-fed phased-array antennas are not, however, without their drawbacks. In particular, phased arrays using series feed networks tend to be significantly more sensitive to design, material and manufacturing tolerances than corporate feed networks, since such tolerances are additive in series feed networks. Furthermore, the beam tilt produced by a series feed is frequency dependent. Acceptable beam-tilt variation due to such frequency dependence determines the useful frequency band ("the bandwidth") of the antenna. Moreover, there is a substantially inverse relationship between the amount of phase (which equates to electrical line length) between adjacent branch lines (e.g., 120 to 122), referred to herein as "inter-element phase," and the bandwidth of the array. Since conventional phase shifters, such as ferrites and switchable delay lines, tend to be large, their use in a series feed network may disadvantageously require an increase in inter-element line length (to accommodate them). Such additional length impacts the phased-array antenna in several ways. First, if high antenna bandwidth is required and thus small inter-element phase, the additional length required when using conventional phase shifters may be regarded as "wasted" phase since it cannot be used for the phase shifters. This ultimately limits the phase-shifting range available from the phase shifters. Second, if a fixed amount of beam steering is desired, additional phase may be required for the phase shifters so that they can provide suitable phase-shifting range to achieve the desired amount of steering.

Thus, there is a need for a steerable, series-fed phased-array antenna that keeps "wasted" inter-element phase low.

SUMMARY OF THE INVENTION

In some embodiments, the present invention advantageously provides a steerable, series-fed, phased-array antenna wherein the inter-element phase that is not associated with phase-shifting members is kept very low. By doing so, phase that is not "wasted" as additional electrical line length is available for the phase shifters. Moreover, the phase shifters used in conjunction with the present antenna advantageously provide a high differential phase shift per unit length of transmission line. Given a fixed amount of overall inter-element phase, such phase shifters provide a relatively large phase-shifting range, with the result that the antenna is steerable over a relatively large range. Alternatively, given a desired antenna beam steering range, relatively less inter-element phase is required to provide the requisite phase shift, such that a relatively large bandwidth advantageously results.

The present antenna comprises a plurality of radiating elements and a phase-shifter array that is integrated into a feed line of the antenna's series feed network. The phase-shifter array advantageously comprises a plurality of identical mechanical phase shifters for beam steering. In some embodiments, the phase-shifter array includes a multiplicity of phase-shifting slabs each of which includes a phase-shifting member, advantageously comprised of a dielectric material. When placed in local electromagnetic fields generated by signals propagating through different regions of a transmission line (or through different transmission lines), which, as used herein, is understood to be a (quasi) transverse electromagnetic (TEM) transmission line (e.g., micro strip line and strip line), the phase-shifting members affect the phase of such signals. In particular, the phase-shifting slabs, in conjunction with the feed network, are operable to shift the phase of each signal relative to that of the other signals, thereby imparting a "relative phase shift" to adjacent radiating elements. When the phase shifting slab is "inserted" between the active line and ground of a transmission line, the transmission line is referred to herein as being "dielectrically loaded."

Each slab in the phase-shifter array also advantageously incorporates at least one impedance-matching member that decreases or eliminates "impedance mismatch." Such impedance mismatch occurs, for example, when the signal travels from air-suspended (i.e., no dielectric between the active line and an associated ground plane) to dielectrically-loaded regions of the transmission line in the absence of compensatory measures. As is known in the art, impedance refers, in the present context, to the ratio of the time-averaged value of voltage and current in a given section of the transmission line. This ratio, and thus the impedance of each line section, depends on the geometrical properties of the transmission line, such as, for example, active line width, the spacing between the active line and the ground, and the dielectric properties of the materials employed. If two lines section having different impedances are interconnected, the difference in impedances ("impedance step" or "impedance mismatch") causes a partial reflection of a signal traveling through such line sections. "Impedance matching" is a process for reducing or eliminating such partial signal reflections by disposing a "matching circuit" between the interconnected line segments. As such, impedance matching establishes a condition for maximum power transfer at such junctions.

Unlike impedance-matching circuits of the prior art, the impedance-matching members used in the present antenna are operable over the full phase-shifting range of the phase shifters, which reduces the incidence and severity of impedance mismatches in series-fed phased-array antennas. As used herein, the phrase "phase-shifting range" refers to a range of relative phase-shift that can be imparted by a phase shifter (e.g., 1$\phi$). The range is defined by the relative phase shift imparted by the phase-shifting member at a first and a second position. In the first position, the phase-shifting member is not present between the active line and the ground plane (or, more properly, the phase-shifting member does not interact with an electromagnetic field generated between the active line and the ground plane due the presence, in the active line, of a signal). In the second position, the phase-shifting member is positioned between the active line and the ground such that it provides a maximum dielectric loading it is capable of providing to the transmission line.

Since phased-array antennas in accordance with the illustrative embodiments exhibit much less impedance mismatch than conventional phased arrays using conventional impedance-matching circuits, the present phase shifters may be comprised of materials having a relatively high dielectric constant Such phase shifters advantageously impart a high differential phase shift per unit length of transmission line, yielding the previously-described benefits.

In some embodiments, the inter-element phase that is not associated with the phase shifters is kept low by utilizing asymmetrically-shaped phase shifters having only one impedance-matching member per phase shifter. Such asymmetrically-shaped phase-shifters are configured such that a buffer region of the feed line that prevents the phase-shifting slab from contacting a power splitter is not required. Dispensing with the buffer region reduces electrical line length and hence, inter-element phase. In such embodiments, an impedance-matching circuit is implemented directly into the transmission line.

It is known that Wilkinson power splitters can be used to reduce sensitivity to impedance mismatch occurring at the antenna ports. Unfortunately, Wilkinson power splitters use substantially more phase than reactive power splitters for implementation. Due to the high inter-element phase normally present in conventional steerable, series-fed phased-arrays, Wilkinson power splitters are not typically used for such applications. Since the present phase-array antennas have relatively low inter-element phase and utilize phase shifters having a relatively high differential phase shift, Wilkinson power splitters are advantageously used in some embodiments to improve antenna stability without substantially compromising antenna bandwidth or phase-shifting range.

Further features and advantages of the present phased-array antennas will become more apparent from the following detailed description of specific embodiments thereof when read in conjunction with the accompany drawings, which are listed below.

DETAILED DESCRIPTION

The present phased-array antennas are useful for wireless telecommunications, among other applications. As will be appreciated by those skilled in the art, the relevant operating frequencies of such wireless-telecommunications applications are typically in the range of about 0.5 to 5 gigahertz (GHz). Quasi-TEM transmission lines, such as micro strip (one ground) or strip lines (two grounds) are usually employed for such applications. Thus, as used herein, transmission line refers to a quasi-TEM transmission line. The relatively homogeneous electromagnetic field that is present between the active line and ground plane of a (quasi) TEM transmission line is used to great advantage in antennas in accordance with the illustrative embodiments of the present invention.

To position the main lobe of the radiation pattern generated by a phased-array antenna at an angle $\theta_o$ (relative to a "bore-sight" beam wherein the main lobe is perpendicular to the radiating antenna elements), the relative phase shift between adjacent radiating elements of the antenna array must be:

$$\phi=3k\pi+2\pi(d/\lambda)\sin\theta_o \qquad [1]$$

where:

k is an integer; d is the spacing between radiating elements; and $\lambda$ the wavelength of the transmitted signal.

The minimal phase between adjacent radiating elements is 360 degrees (i.e., k=1) for a bore-sight beam. The required phase relationships between the radiating elements can be obtained using either a "series" or a "corporate" feed network. The present invention provides a phased-array antenna utilizing a series-feed network. Phased-array antennas in accordance with illustrative embodiments of the present invention advantageously incorporate phase-shifter arrays described in applicants' copending U.S. patent application Ser. No. 09/040,850 filed Mar. 18, 1998, entitled, "Article Comprising a Phase Shifter,". Moreover, various implementations of the aforementioned phase-shifter arrays into series feed networks are described in applicants' copending U.S. patent application Ser. No. 09/040,780 filed Mar. 18, 1998, entitled, "Steerable Phased-Array Antenna."

Figure 1:
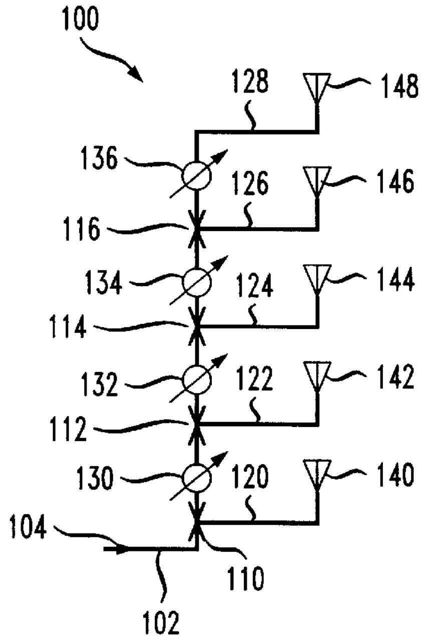
FIG. 1 PRIOR ART
FIG. 1 depicts a conventional series-feed arrangement for a phased-array antenna.
Figure 2A:
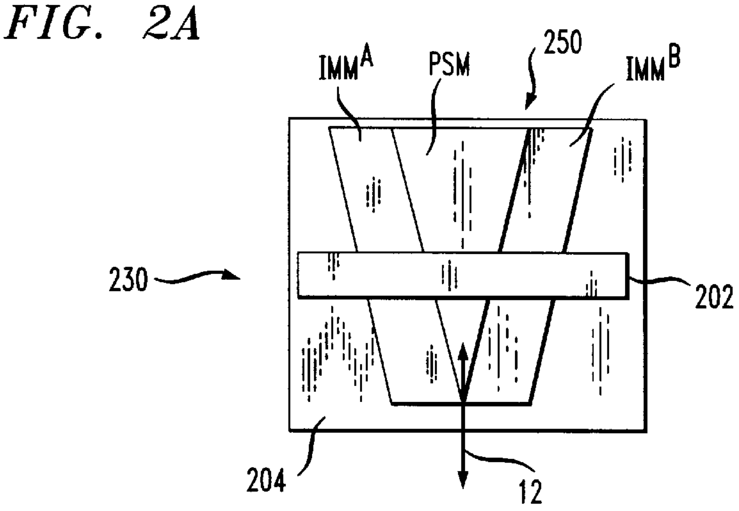
FIGS. 2*a* and 2*b* depicts top and side-cross sectional views of an illustrative phase shifter for use in conjunction with illustrative embodiments of the present invention.
Figure 2B:
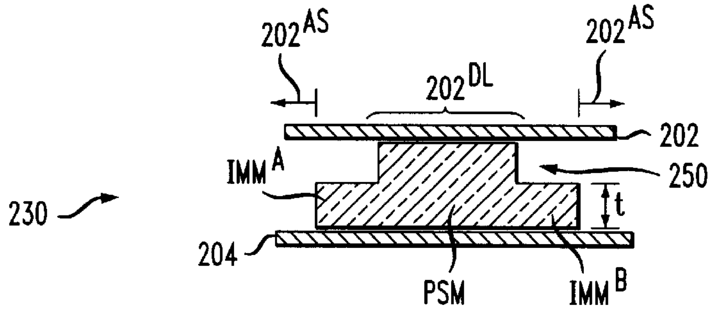

In some embodiments, the present phased-array antennas incorporate illustrative phase shifter 230 depicted in a top-view and a side cross-sectional view in FIGS. 2*a* & 2*b*, respectively. Phase shifter 230 advantageously comprises phase-shifting slab 250 having phase-shifting member PSM comprised of a dielectric material. As phase-shifting member PSM is moved in a direction indicated by direction vector 12 between transmission line 202 and ground plane 204, the dielectric loading of the transmission line changes. Such a change causes a relative phase shift in a signal propagating within transmission line 202 with respective to another signal traveling in another portion of the transmission line (not shown).

In some illustrative embodiments, the phase-shifting member is configured to provide a continuous, linear change in width, while maintaining a uniform dielectric constant and thickness throughout. Due to such a linear change in the width, the amount of dielectric material positioned between the active line and the ground varies linearly as the phase-shifting slab is moved therebetween As such, the present phase shifters advantageously produce a linear phase response.

In accordance with the present invention, phase-shifting slab 250 further includes two impedance-matching members $IMM^A$ and $IMM^B$ for decreasing or eliminating impedance mismatch between air-suspended and dielectrically-loaded regions of a signal-carrying transmission line. The impedance-matching members are advantageously incorporated into the phase-shifting slab of the present phase shifters. In use, the impedance-matching members are inserted, along with the phase-shifting slab, between the active line and the ground plane. When so inserted, the impedance-matching members, which comprise a dielectric material, provide a dielectric loading suitable for reducing or eliminating potential impedance mismatch between air-suspended and dielectrically-loaded regions of the transmission line.

The impedance-matching members eliminate impedance mismatch at one specific frequency. As signal frequency deviates from the one frequency, the impedance mismatch between the dielectric- and air-suspended regions of the transmission line begins to increase. Even in such cases, as long as the design bandwidth of the impedance-matching member is not exceeded, the incidence and severity of signal reflections that occur due to the impedance mismatch are reduced relative to those experienced with conventional phase shifters not possessing an impedance-matching member.

In phase-shifting slab 250, impedance-matching members are advantageously configured such that impedance mismatch is eliminated, or, depending upon signal frequency, substantially reduced, over the full phase-shifting range. In embodiments in which full-range impedance matching is provided, the phase-shifting slabs may advantageously be comprised of high-dielectric constant materials, such that they provide a high differential phase shift per unit length of transmission line.

In illustrative phase-shifting slab 250, the phase-shifting member and the impedance-matching members are advantageously formed from a single dielectric slab having a first thickness. The thickness of phase-shifting member PSM is equal to the first thickness. Slab thickness is simply stepped (i.e., reduced) as appropriate, on both sides of phase-shifting member PSM, to create two impedance-matching members $IMM^A$ and $IMM^B$ that provide a dielectric loading suitable for reducing or avoiding impedance mismatch. Such impedance-matched phase-shifting slabs are simple and inexpensive to manufacture. In other embodiments, the impedance-matching members can be tapered such that there is a uniform increase in thickness over the impedance-matching member.

The dielectric constant of the phase-shifting members and impedance-matching members for use in the present phase shifters will suitably be in a range of about 2 to 15. While materials with a lower or higher dielectric constant can be used, an increase in size of the phase-shifting members (with decreasing dielectric constant), and an increase in sensitivity to antenna tolerances and slab positioning (with increasing dielectric constant), generally makes the use of such materials less desirable. Materials suitable for use as the phase-shifting members and impedance-matching members are well known in the art.

No simple expression describes the relation between the thickness and width of a layer of dielectric material and that layer's effect on transmission line impedance. The required calculations can be performed using a "method-of-moment"

calculation familiar to those skilled in the art. Such calculations tend to be rather tedious, however, and are therefore usually performed with the aid of a software "tool." In particular, an electromagnetic (EM) simulator, such as Momentum™, available from Hewlett-Packard Company of Palo Alto, Calif., IE3D™, available from Zeland Software of Frement Calif., and Sonnet™, available from Sonnet Software of Liverpool, N.Y., may be used for this purpose.

In the illustrative embodiments described herein, impedance-matching members provide 90 degrees of phase. Line impedance $Z_t$ of each such impedance-matching member is given by the expression:

$$Z_t=(Z_a Z_d)^{1/2} \quad [2]$$

where:

$Z_a$ is the line impedance of the air-suspended active line; and $Z_d$ is the line impedance of the dielectrically-loaded active line.

With reference to FIG. 2*b*, $Z_d$ is the line impedance for region $\mathbf{202}^{DL}$ of active line 222, and $Z_a$ is the line impedance for region $\mathbf{202}^{AS}$ of active line 202.

In the illustrative embodiment shown in FIGS. 2*a* & 2*b*, one impedance-matching member is disposed on each side of phase-shifting member PSM of phase-shifting slab 250. In other embodiments (not shown), each of the single impedance-matching members are replaced by multiple impedance-matching members. In those other embodiments, each successive impedance-matching member is thicker than the previous one. The use of such multiple impedance-matching members advantageously provides a more gradual impedance transition when signal frequency deviates from the impedance-matching design center frequency. Additional embodiments (not shown) provide impedance-matching members having a thickness that advantageously varies regularly in the manner of a "wedge" and typically increasing to a maximum at the phase-shifting member/impedance-matching member interface. Line impedance imparted by such a tapered impedance-matching member varies regularly. Such tapered impedance-matching members represent a logical conclusion of the use of an increasing number of discrete impedance-matching members. The above-described slab configurations, and additional illustrative configurations, are described in aforementioned U.S. patent application Ser. No. 09/040,850.

Figure 3A:
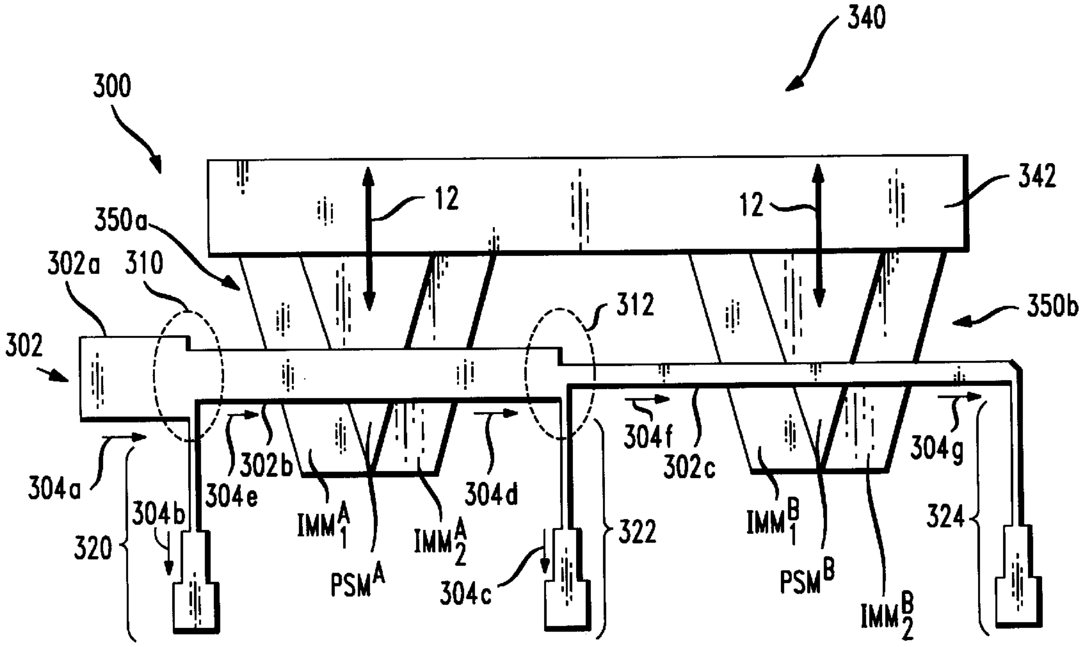
FIG. 3*a* depicts a first phased-array antenna in accordance with an illustrative embodiment of the present invention.

FIG. 3*a* depicts a portion of series-fed phased-array antenna 300 in accordance with an illustrative embodiment of the present invention. The portion of antenna 300 depicted in FIG. 3*a* includes phase-shifter array 340, network feed line 302 comprising sections 302*a*, 302*b* and 302*c*, reactive power splitters 310 and 312, and branch lines 320, 322 and 324 that lead to individual radiating antenna elements (not shown).

Illustrative phase-shifter array 340 has two phase-shifting slabs 350*a*, 350*b* that are advantageously mechanically linked by rigid linkage 342. Each slab advantageously includes a phase-shifting member (e.g., member $PSM^A$) and two impedance-matching members (e.g.,members $IMM_1^A$ and $IMM_2^A$). Mustrative phase-shifting slabs 350*a* and 350*b* are configured like slab 250 depicted in FIGS. 2*a* & 2*b*.

When phase-shifting members $PSM^A$ and $PSM^B$ are inserted at a reference position between respective portions 302*b* and 302*c* of feed line 302 and a ground plane, respective branch lines 320, 322, and 324 are provided with a signals having an amplitude and phase (modulo $2\pi$) resulting in a reference radiation pattern. Moving phase-shifting members $PSM^A$ and $PSM^B$ of respective phase-shifting slabs 350*a* and 350*b* with respect to their reference positions imparts a relative phase difference of $1\Delta\phi$ to the reference-position phase of adjacent radiating elements disposed at an end of the branch lines. Such a change in relative phase results in a change in the antenna's radiation pattern. In this manner, the antenna beam is "steered." Due to the smooth, advantageously linear change in the width of phase-shifting members $PSM^A$ and $PSM^B$, the phase response to the movement of the phase-shifting slabs is linear.

In more detail, signal 304*a* traveling along portion 302*a* of feed line 302 is suitably split into signals 304*b* and 304*c* by reactive power splitter 310. Reactive power splitter 310 comprises three lines (i.e., 302*a*, 302*b* and aportion of line 320) having different impedances. By adjusting the impedances of such lines in well-known fashion, signal 304*b* having a first power is directed along branch line 320, and signal 304*c* having a second power is directed along portion 302*b* of feed line 302. In the illustrative antenna depicted in FIG. 3*a*, signal 304*b* is not phase shifted.

As signal 304*c* travels along portion 302*b* of the feed line, it travels from an air-suspended region of line portion 302*b* to a dielectrically-loaded region of line portion 302*b* (i.e., wherein phase shifting member $PSM^A$ is inserted between the line portion and a ground). Such dielectric loading changes an effective dielectric constant of line portion 302*b*, which, in turn, affects the propagation velocity of signal 304*c* traveling through the line. Signal 304*d* leaving the dielectrically-loaded region of line portion 302*b* obtains additional phase $\Delta\phi$ when phase-shifting member $PSM^A$ is moved from its reference position. Signal 304*d* is suitably split into signals 304*e* and 304*f* by reactive power splitter 312. Signal 304*g* leaving a dielectrically-loaded region of line portion 302*c* is phase-shifted relative to signal 304*e* and 304*f*.

In some embodiments, such as the one depicted in FIG. 3*a*, individual slabs are advantageously mechanically linked via rigid linkage 342, such that a single drive mechanism can be used to actuate both phase shifters. Using a single drive mechanism advantageously lowers antenna cost, and reduces time spent for design and calibration. Moreover, use of a single drive mechanism allows for easy implementation of remote beam steering capabilities.

Each phase-shifting slab 350*a* and 350*b* advantageously incorporates respective impedance-matching members $IMM_1^A/IMM_2^A$ and $IMM_1^B/IMM_2^B$. The impedance-matching members shown in FIG. 3*a* advantageously provide impedance matching over the full shifting range of the accompanying phase-shifting member by virtue of their configuration. Due to such full-shifting range impedance-matching members, the phase-shifting members can be advantageously comprised of relatively high-dielectric-constant materials and therefore provide a high differential phase shift per unit length of transmission line. Lower dielectric constant materials should be used in the absence of the present full-shifting range impedance-matching members, since, relative to higher dielectric constant materials, the impedance transitions tend to be more gradual such that signal reflections are less pronounced. Unfortunately, using low dielectric constant materials disadvantageously results in a more restricted beam steering range and larger dielectric slabs.

Figure 3B:
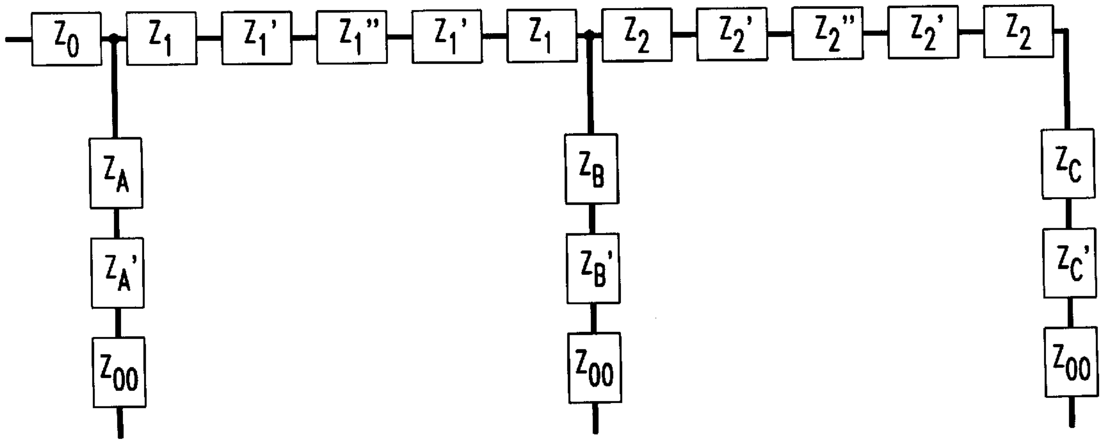
FIG. 3*b* depicts a transmission line circuit representation of the phased-array antenna of FIG. 3*a*.

FIG. 3*b* depicts a transmission line circuit representation of antenna 300. In FIG. 3*b*, each box is representative of an impedance transition. Identically-referenced boxes have the same impedance. Each $Z_1$ represents 90 degrees of phase provided in impedance-matching members $IMM_1^i$ and $IMM_2^i$. In each branch line, there is an impedance transition from the reactive power splitter to a set branch line impedance $Z_{00}$. Ninety degrees of phase is provided at in $Z_A'$, $Z_B'$, and $Z_C'$. Note that $Z_A$ and $Z_B$ can have zero phase (i.e., zero electrical length).

Note that the impedance transitions specified in the transmission line circuit representation in FIG. 3*a* can be obtained in any suitable manner. For example, impedance transitions (other than those due to slab integrated impedance-matching members) may be obtained by known techniques, for example, by an appropriate change in active line width, by changing the gap between the active line and the ground plane, or by changing the dielectric constant of the circuit board upon which the active line is typically disposed. As used herein, the phrase "impedance circuit" is used to refer to elements, such as those described above (but not including impedance-matching members), that provide impedance transitions. Configuring impedance-matching members to obtain impedance transitions is described above and in the previously-referenced patent applications.

Regarding the relationship between various impedances:

For a reactive power splitter: $1/Z_O=1/Z_1+1/Z_A$, etc. [3]

For impedance-matching members: $Z_1'=(Z_1Z_1'')^{1/2}$, etc. [4]

For impedance circuits: $Z_A'=(Z_AZ_{OO})^{1/2}$, etc. [5]

Antenna 300 advantageously provides low inter-element phase. Specifically, as described above, 180° of phase is used in each section of feed line (i.e., 180° in line portions 302*b* and 302*c* due to the two impedance-matching members associated with each phase shifting slab 350*a* and 350*b*). For the present description, it is assumed that at a "reference" position of the phase shifters, a bore-sight antenna beam is generated. As previously noted, for abore-sight beam, 360° of inter-element phase, or integer multiples thereof, are required between adjacent radiating antenna elements at the reference position. Thus, since 180° is used for impedance matching, a relatively large 180° of phase is available for each phase shifter (assuming 360° of inter-element phase is desired). In conjunction with using the present phase shifters that provide a high differential phase shift per unit length of transmission line, antenna 300 provides a relatively large beam steering range while maintaining a relatively broad bandwidth. It should be understood that in other embodiments wherein a broad-side antenna beam is not obtained at a reference position, an inter-element phase of 360° or multiples thereof is not required. In such cases, it is still desirable to reduce phase not associated with the phase shifters, and the present teachings can be applied to do so.

In phased-array antenna 300 depicted in FIG. 3*a*, the impedance in line portion 302*b* is different from the impedance of line portion 302*c*. As such, to achieve a phase differential of 1Δϕ for successive radiating elements, phase-shifting members $PSM^A$ and $PSM^B$ must provide a different dielectric loading. In other words, phase-shifting slabs 350*a* and 350*b* are not identical. Using non-uniform phase-shifting slabs may be undesirable. That potential drawback is addressed in phased-array antenna 400 depicted in FIG. 4*a*.

Like antenna 300, phased-array antenna 400 includes feed line 402, reactive power splitters 410 and 412, and phase-shifter array 440 having slabs 450*a* and 450*b* linked via rigid linkage 442 and movable along direction vector 12. In antenna 400, phase-shifting members $PSM^A$ and $PSM^B$ of respective phase-shifting slabs 450*a*, 450*b* dielectrically load line portions 402*a* having advantageously identical impedances. As such, phase-shifting members $PSM^A$ and $PSM^B$ can be identical. As shown in both FIGS. 4*a* & 4*b*, the use of such identical phase-shifting members is enabled by an impedance circuit that is provided before each phase-shifting member.

Figure 4A:
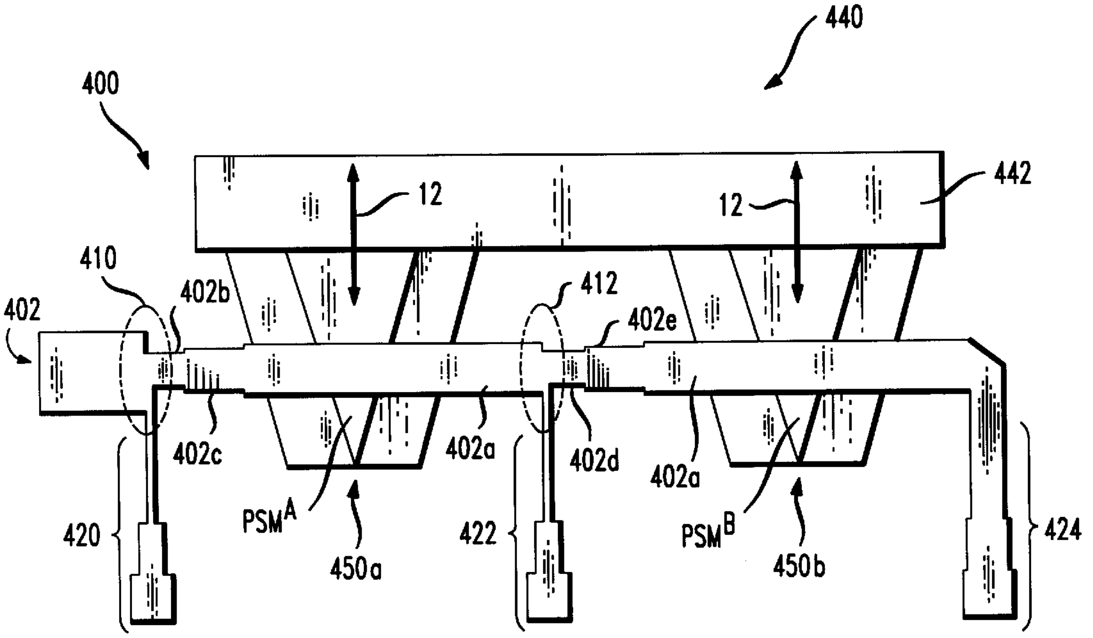
FIG. 4*a* depicts a second phased-array antenna in accordance with an illustrative embodiment of the present invention.
Figure 4B:
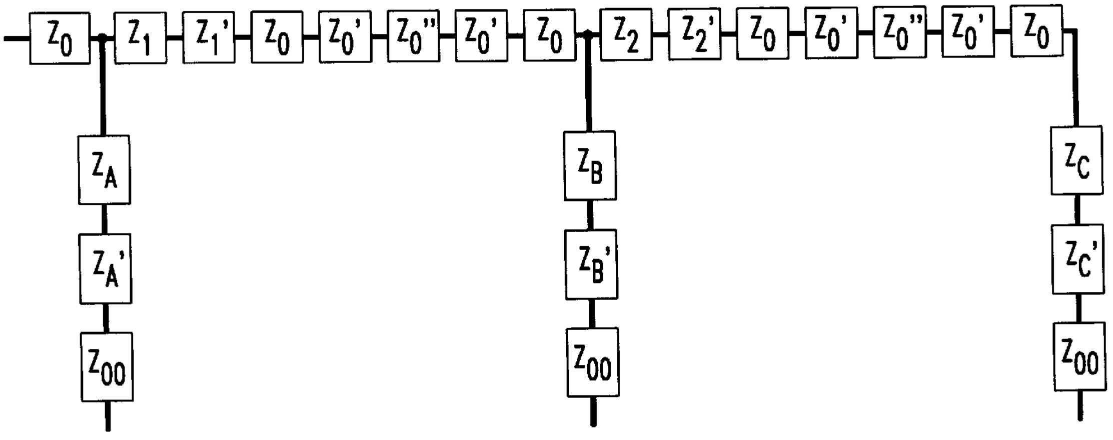
FIG. 4*b* depicts a transmission line circuit representation of the phased-array antenna of FIG. 4*a*.

Such an impedance circuit is depicted, in FIG. 4*a*, by line portions 402*c* and 402*e*. Those impedance circuits are represented more generally in FIG. 4*b* by respective impedance transitions $Z_1'$ and $Z_2'$, both of which provides 90 degrees of phase. Thus, although phased-array antenna 400 advantageously has identical phase-shifting members, it suffers from the additional 90 degrees of "wasted" inter-element phase. Assuming again that 360° of inter-element phase is available, only 90 degrees is available for each phase shifter.

Regarding the relationship between various impedances:

For a reactive power splitter: $1/Z_O=1/Z_1+1/Z_A$, etc. [6]

For impedance-matching members: $Z_0'=(Z_0Z_0'')_{520}{}^{1/2}$, etc. [7]

For impedance circuits: $Z_A'=(Z_AZ_{00})^{1/2}$, etc. [8]

$Z_1'=(Z_1Z_O)^{1/2}$, etc. [9]

Note that line portions 402*b* and 402*d* can have zero phase (i.e., zero electrical length).

Figure 5A:
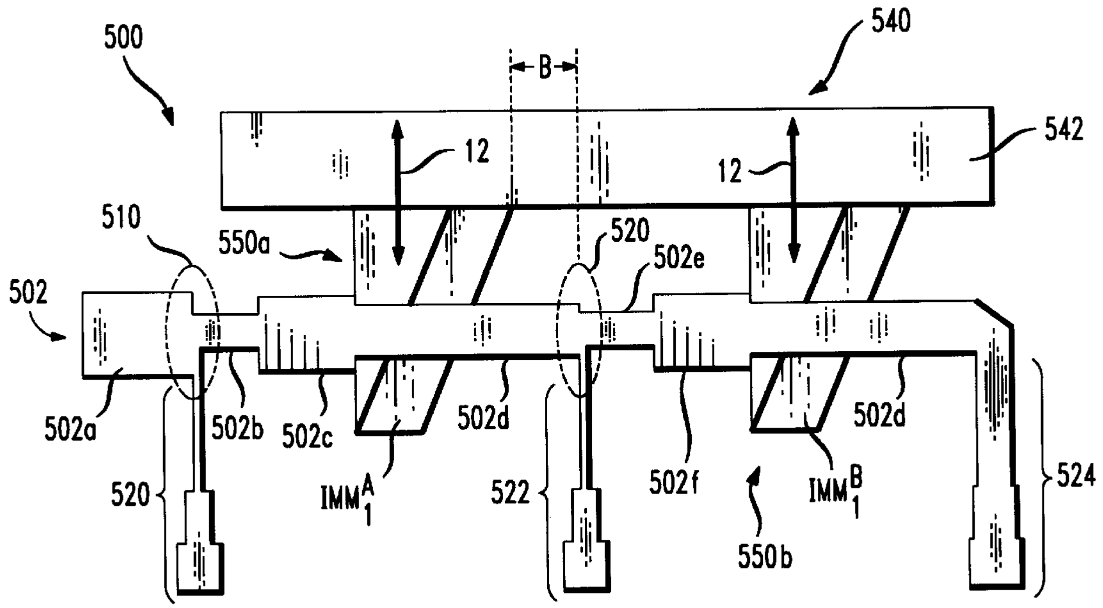
FIG. 5*a* depicts a third phased-array antenna in accordance with an illustrative embodiment of the present invention.
Figure 5B:
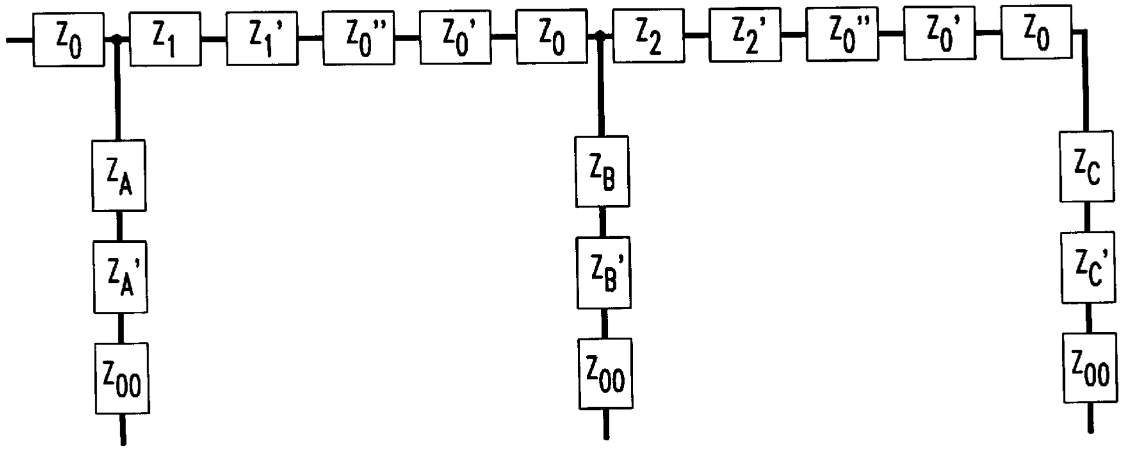
FIG. 5*b* depicts a transmission line circuit representation of the phased-array antenna of FIG. 5*a*.

Though antennas 300 and 400 provide advantages over conventional antennas, they suffer from the aforedescribed drawbacks. The design of phased-array antenna 500 depicted in FIG. 5*a* addresses the problems of both such antennas. Antenna 500 advantageously provides, like antenna 300, only 180° degrees of inter-element phase that is not associated with a phase shifter, yet utilizes identical phase-shifting slabs, like antenna 400. In antenna 500, each slab 550*a*, 550*b* includes only one impedance-matching member $IMM_1$, which provides ninety degrees of phase. Impedance circuits, represented by line portions 502*c* and 502*f*, are disposed "upstream" of respective phase-shifting slabs 550*a* and 550*b* to transition between air-suspended to dielectrically-loaded regions of feed line. Such circuits are represented in FIG. 5*b* by respective impedance transitions $Z_1'$ and $Z_2'$, both of which provide ninety degrees of phase. Thus, there is only 180 degrees of phase in the feed line portion between branches 520 and 522.

Regarding the relationship between various impedances:

For a reactive power splitter: $1/Z_O=1/Z_1+1/Z_A$, etc. [10]

For impedance-matching members: $Z_0'=(Z_0Z_0'')^{1/2}$, etc. [11]

For impedance circuits: $Z_A'=(Z_AZ_{00})^{1/2}$, etc. [12]

$Z_1'=(Z_1Z_0'')^{1/2}$, etc. [13]

Line sections 502*b* and 502*e* can have zero phase.

Note that phase-shifting slabs 350*a*, 350*b*, 450*a*, 450*b* (FIGS. 3*a* & 4*a*) utilize two impedance-matching members. Consequently, a "buffer" length of active line must be provided on both sides of each slab to ensure that when an impedance-matching member is fully inserted between the active line and the ground plane, it does not contact the power splitters (which contact would change the design impedance and the power split). In FIG. 5*a*, buffer line "b" is depicted between the "rightmost" edge of impedance-matching member $IMM_1^A$ and reactive power splitter 520. The buffer line represents some amount of "wasted" phase. Due to the asymmetric layout of phase-shifting slabs 550*a* and 550*b*, the use of only one slab-integrated impedance-matching member per slab, and the use of line-integrated impedance circuits 502*c* and 502*f*, a buffer region is required on only side of each phase-shifting slab. Such an arrangement advantageously reduces "wasted" inter-element phase.

Figure 6A:
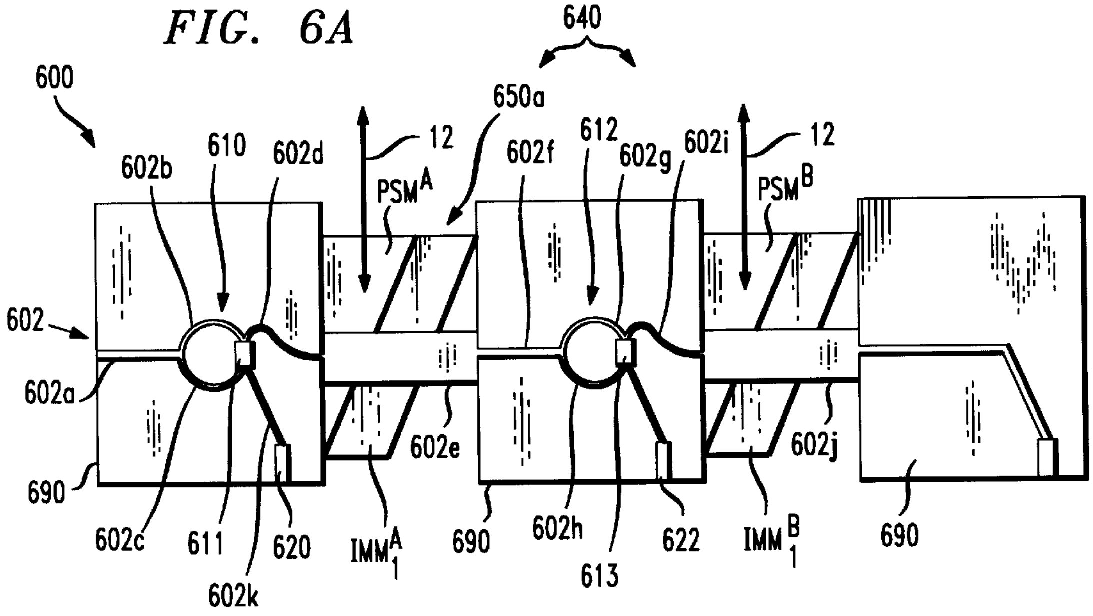
FIG. 6*a* depicts a fourth phased-array antenna in accordance with an illustrative embodiment of the present invention.

Antennas 300–500 are susceptible to the inevitable impedance mismatches occurring at the antenna ports. As is known in the art, Wilkinson power splitters exhibit much better stability than reactive power splitters to such impedance mismatches. Wilkinson power splitters do, however, require substantially more phase to implement. As such, their use in conventional steered, series-fed, phased-array antennas is problematic. In particular, as such conventional antennas typically have high inter-element phase and use phase shifters having typically low differential phase shift, the extra phase required for implementing a Wilkinson power splitter may not be tolerable. By contrast, due to the relatively small amount of "wasted" inter-element phase of the present antennas, and the relatively high differential phase shift of the phase shifters of the present antennas, a Wilkinson power splitter is advantageously used therewith to improve stability. A phased-array antenna 600 incorporating a Wilkinson power splitter is depicted in FIG. 6*a*.

Phased-array antenna 600 comprises feed line 602, Wilkinson power splitters 610 and 612 disposed on respective circuit board 609, and phase-shifter array 640 (rigid linkage not shown) having phase-shifting slabs 650*a* and 650*b* movable along direction vector 12. Branch lines 620 and 622 each lead to a radiating antenna element (not shown). In antenna 600, phase-shifting members $PSM^A$ and $PSM^B$ of respective phase-shifting slabs 650*a*, 650*b* dielectrically load line portions 602*e* and 602*j* having identical impedances. As such, phase-shifting slabs 650*a*, 650*b* are advantageously identical.

Wilkinson power splitters 610 and 612 include respective half-circular line portions 602*b*, 602*c* and 602*g*, 602*h*, and respective resistors 611 and 613. Resistor 611 prevents signal reflections from branch line 620 from coupling into branch 602*d*. Likewise, resistor 613 prevents signal reflections from branch line 622 from coupling into branch 602*i*. The Wilkinson power splitters are disposed on a circuit board 609 or other suitable support. It should be understood that other arrangements (i.e., other than a Wilkinson power splitter) including resistive or capacitive elements can be used for preventing signal reflections generated at antenna ports from coupling into successive lines.

Figure 6B:
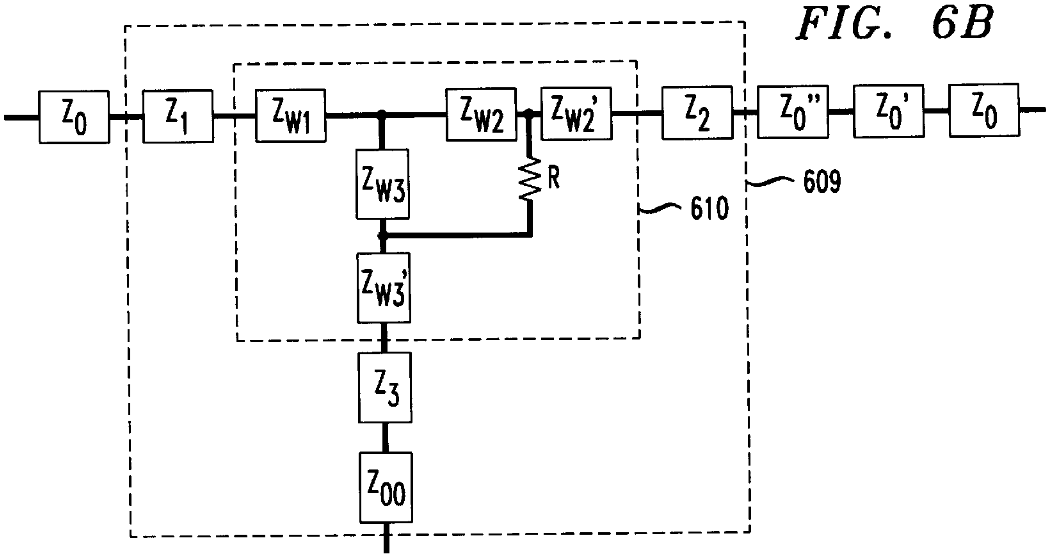
FIG. 6*b* depicts a transmission line circuit representation of the phased-array antenna of FIG. 6*a*.

FIG. 6*b* depicts a transmission line circuit representation of antenna 600. Impedance transitions occurring within the Wilkinson power splitters are shown within box 610. The box 609 (i.e., circuit board) shows the impedance transitions occurring in a portion of circuit board 609 located over ground 690, as opposed to those portions of circuit board 609 that are "air-suspended." Ninety degrees of phase is used in each of the half-circular line portions 602*b* and 602*c*, corresponding to respective impedance transitions $Z_{W2}$ and $Z_{W3}$ in FIG. 6*b*. Thus, 180 degrees of phase is used in the Wilkinson power splitters proper. Moreover, appropriate impedance transitions out of a splitter (i.e., line portion 602*d* represented by impedance transition $Z_2$) and into the subsequent splitter (i.e., impedance-matching member $IMM_1^A$ represented by impedance transition $Z_0$) each require ninety degrees of phase. Thus, for an impedance-matched system, 360 degrees of inter-element phase are used. As such, additional phase is required for the phase shifters. Note that $Z_{W1}$, $Z_{W2}'$, and $Z_{W3}'$ were set to zero phase (i.e., zero electrical length).

Regarding the relationship between various impedances:

For impedance circuits: $Z_1=(Z_0 Z_{W1})^{1/2}$, etc. [14]

$Z_2=(Z_0'' Z_{W2}')^{1/2}$, etc. [15]

$Z_3=(Z_{00} Z_{W3}'')^{1/2}$, etc. [16]

For impedance-matching members: $Z_0'=(Z_0'' Z_0)^{1/2}$, etc. [17]

Figure 6C:
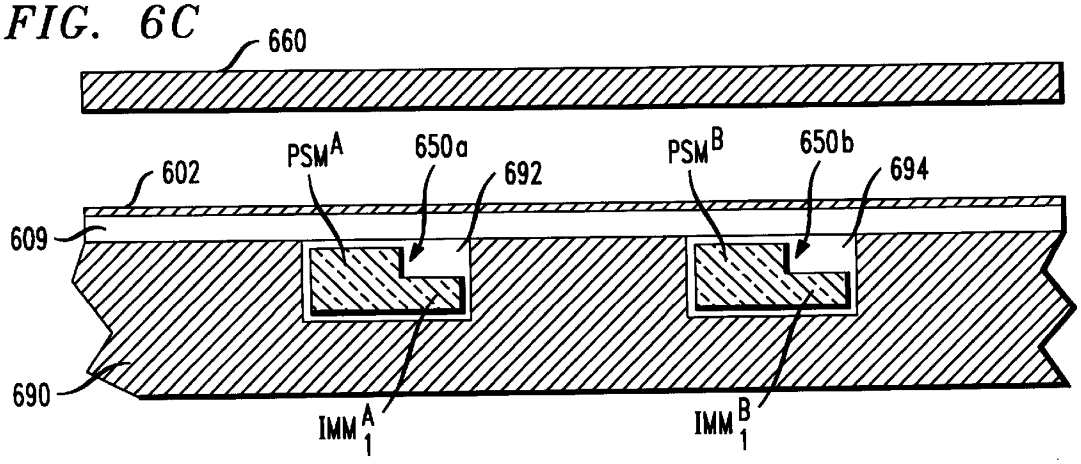
FIG. 6*c* depicts a cross-sectional side view of the phased-array antenna of FIG. 6*a*.

FIG. 6*c* depicts a side view of phased-array antenna 600. Phase-shifting slabs 650*a* and 650*b* are received by respective channels 692 and 694 in ground 690. Feed line 602 is disposed on circuit board 609. Cover 660, typically metal, is provided for shielding.

The phase-shifting slabs depicted in phased-array antenna 600 have one impedance-matching member $IMM_1$. It should be appreciated that in other embodiments, phase-shifting slabs including two impedance-matching members are used in conjunction with antenna 600. Such a modification requires an increase in length between adjacent Wilkinson power splitters to allow for the increased width of such phase-shifting slabs.

It is to be understood that the embodiments described herein are merely illustrative of the many possible specific arrangements that can be devised in application of the principles of the invention. Other arrangements can be devised in accordance with these principles by those of ordinary skill in the art without departing from the scope and spirit of the invention. It is therefore intended that such other arrangements be included within the scope of the following claims and their equivalents.

We claim:

1. A steerable phase array antenna, comprising:

a series-feed network comprising a feed line that receives a first signal and propagates a first group of signal components resulting from power splitting of the first signal;

a plurality of power splitters for splitting the first signal and for splitting a portion of the first group of signal components propagating in the feed line;

a plurality of branch lines for receiving a second group of signal components resulting from power splitting of the first signal and the portion of the first group of signal components;

a plurality of radiating elements, each one electrically connected to one branch line, wherein the radiating elements are operable to receive the second group of signal components and to transmit them as electromagnetic energy; and a phase shifter array comprising a plurality of phase-shifting slabs, each phase-shifting slab having:

a phase-shifting member operable to change the phase of one of the signal components of the first group, and one impedance-matching member depending from a second edge of the phase-shifting member that reduces impedance mismatch occurring in the feed line while the phase-shifting member is changing the phase of the one signal component.

2. The steerable phased-array antenna of claim 1, wherein the power splitters are reactive power splitters.

3. The steerable phased-array antenna of claim 2, further comprising a plurality of impedance circuits disposed within the feed line, one impedance circuit located between each power splitter and a first edge of each phase-shifting slab.

4. The steerable phased-array antenna of claim 3, wherein total inter-element phase that is not associated with a phase shifter is about 180°.

5. The steerable phased-array antenna of claim 4, wherein the phase-shifting slabs are identical.

6. The steerable phased-array antenna of claim 1, wherein the steerable phased-array antenna has a physical adaptation that renders it substantially insensitive to impedance mismatch at antenna ports.

7. The steerable phased-array antenna of claim 6, wherein the physical adaptation comprises using Wilkinson power splitters.

8. The steerable phased-array antenna of claim 7, wherein the Wilkinson splitters incorporate a resistive element.

9. The steerable phased-array antenna of claim 8, wherein the Wilkinson power splitters are disposed on a support.

10. The antenna of claim 1, wherein the phase-shifting member is physically configured to provide a substantially linear phase response.

11. A steerable phased-array antenna, comprising:

a plurality of radiating antenna elements electrically connected to a plurality of branch lines;

a plurality of signal power splitters disposed in a feed line, each signal power splitter operable to split a signal it receives delivering a first signal portion to one of the branch lines and a second signal portion to the feed line, and further wherein the signal power splitters are arranged in series such that the signal split by each successive power splitter is the second signal portion delivered to the feed line by each preceding signal power splitter;

a plurality of phase-shifting slabs, each physically configured to be disposed between a different portion of the feed line and a ground plane associated therewith, each phase-shifting slab having:

a phase-shifting member comprised of a dielectric material suitable for affecting a dielectric loading of the different portion of feed line and therefore operable to phase shift one of the second signal portions traveling therethrough, and at least one impedance-matching member that reduces impedance mismatch occurring in the different portion of feed line due to the presence of the phase-shifting member;

wherein, as each phase-shifting slab is moved from a reference position, which reference position imparts a phase and amplitude to the second signal portions that result in the radiating antenna elements generating a reference radiation pattern, a relative phase difference of $1\Delta\phi$ is imparted to the reference-position phase of adjacent radiating antenna elements, thereby changing the reference radiation pattern.

12. The steerable phased-array antenna of claim 11, wherein the signal power splitters comprise a resistive element.

13. The steerable phased-array antenna of claim 11, wherein each phase-shifting slab is identical and further mechanically linked to other phase-shifting slabs.

14. The steerable phased-array antenna of claim 11, further comprising an impedance circuit integrated in the feed line between each signal power splitters and a first edge of each phase-shifting member, and wherein each phase-shifting slab has one impedance-matching member depending from a second edge of each phase-shifting member.

* * * * *